United States Patent
Shimizu et al.

(10) Patent No.: US 8,265,142 B2
(45) Date of Patent: Sep. 11, 2012

(54) ENCODING BIT-RATE CONTROL METHOD AND APPARATUS, PROGRAM THEREFOR, AND STORAGE MEDIUM WHICH STORES THE PROGRAM

(75) Inventors: Atsushi Shimizu, Yokosuka (JP); Ryuichi Tanida, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 295 days.

(21) Appl. No.: 12/529,658

(22) PCT Filed: Mar. 5, 2008

(86) PCT No.: PCT/JP2008/053959
§ 371 (c)(1),
(2), (4) Date: Sep. 2, 2009

(87) PCT Pub. No.: WO2008/111458
PCT Pub. Date: Sep. 18, 2008

(65) Prior Publication Data
US 2010/0118937 A1    May 13, 2010

(30) Foreign Application Priority Data
Mar. 14, 2007  (JP) .................................. 2007-064271

(51) Int. Cl.
*H04N 7/12*   (2006.01)
*H04N 11/02*  (2006.01)
*H04N 11/04*  (2006.01)

(52) U.S. Cl. .............................. 375/240.03; 375/240.26

(58) Field of Classification Search .................. None
See application file for complete search history.

(56) References Cited

U.S. PATENT DOCUMENTS
5,283,646 A * 2/1994 Bruder ..................... 375/240.12
(Continued)

FOREIGN PATENT DOCUMENTS
| EP | 0 424 060 A2 | 4/1991 |
| EP | 0 757 490 A2 | 2/1997 |
| EP | 0 773 688 A2 | 5/1997 |
| EP | 1032213 A2 | 8/2000 |
| EP | 1120976 A1 | 8/2001 |

(Continued)

OTHER PUBLICATIONS

Adachi, S., et al., CAVLC Cleanup to Accommodate ABT including Field Scans Joint Video Team (JVT) of ISO/IEC MPEG & ITU-T VCEG (ISO/IEC JTC1/SC29/WG11 and ITU-T SG16 Q.6), 5th Meeting, Geneva, Switzerland, Oct. 9-17, 2002, pp. 1-4, XP002339408.

(Continued)

*Primary Examiner* — Sath V Perungavoor
*Assistant Examiner* — Kevin McInnish
(74) *Attorney, Agent, or Firm* — Harness, Dickey & Pierce, P.L.C.

(57) ABSTRACT

An encoding bit-rate control method used in video encoding in which intraframe prediction and interframe prediction are switchably used. The method includes measuring an amount of code generated for quantized information and an amount of code generated for non-quantized information for the picture which has been encoded; computing a ratio of the amount of code generated for the non-quantized information to the total amount of generated code, based on the above measured amounts of code; and determining a target amount of code of an encoding target picture by using the computed ratio of the amount of code generated for the non-quantized information. The target amount of code may be determined by computing a complex index for the quantized information of the picture which has been encoded, and estimating an amount of code generated when the encoding target picture is encoded using a predetermined assumed quantization step size, based on the above index and the ratio of the amount of code generated for the non-quantized information.

8 Claims, 7 Drawing Sheets

U.S. PATENT DOCUMENTS

| | | | |
|---|---|---|---|
| 5,398,068 A | 3/1995 | Liu et al. | |
| 5,398,078 A | 3/1995 | Masuda et al. | |
| 5,760,836 A | 6/1998 | Greenfield et al. | |
| 5,781,237 A | 7/1998 | Fukuda | |
| 5,832,128 A | 11/1998 | Suzuki | |
| 5,835,145 A | 11/1998 | Ouyang et al. | |
| 6,148,029 A | 11/2000 | Fert | |
| 6,173,012 B1 | 1/2001 | Katta et al. | |
| 6,414,995 B2 | 7/2002 | Okumura et al. | |
| 6,480,544 B1 | 11/2002 | Uehara et al. | |
| 6,546,050 B2 | 4/2003 | Ramaswamy | |
| 6,567,554 B1 | 5/2003 | Sugahara et al. | |
| 6,798,837 B1 | 9/2004 | Uenoyama et al. | |
| 6,859,496 B1 | 2/2005 | Boroczky et al. | |
| 6,963,608 B1 | 11/2005 | Wu | |
| 7,042,943 B2 | 5/2006 | Haskell et al. | |
| 7,197,072 B1 | 3/2007 | Hsu et al. | |
| 7,953,154 B2 | 5/2011 | Murakami et al. | |
| 2002/0122482 A1 | 9/2002 | Kim et al. | |
| 2003/0043917 A1 | 3/2003 | Bublil et al. | |
| 2003/0095594 A1* | 5/2003 | Laksono et al. | 375/240.03 |
| 2003/0112872 A1 | 6/2003 | Park et al. | |
| 2004/0120404 A1 | 6/2004 | Sugahara et al. | |
| 2004/0126028 A1 | 7/2004 | Adachi et al. | |
| 2004/0197024 A1 | 10/2004 | Bobichon et al. | |
| 2005/0036698 A1 | 2/2005 | Beom | |
| 2005/0063468 A1 | 3/2005 | Shimizu et al. | |
| 2005/0066318 A1 | 3/2005 | Chujoh et al. | |
| 2005/0078748 A1* | 4/2005 | Moni et al. | 375/240.03 |
| 2005/0152450 A1 | 7/2005 | Ueno et al. | |
| 2005/0159946 A1 | 7/2005 | Chen et al. | |
| 2005/0175093 A1 | 8/2005 | Haskell et al. | |
| 2005/0207493 A1 | 9/2005 | Kobayakawa | |
| 2005/0243930 A1 | 11/2005 | Asano et al. | |
| 2006/0072666 A1 | 4/2006 | Cho et al. | |
| 2006/0126732 A1 | 6/2006 | Pian et al. | |
| 2006/0153293 A1* | 7/2006 | Hsu et al. | 375/240.03 |
| 2006/0159357 A1 | 7/2006 | Mizuno | |
| 2006/0171457 A1 | 8/2006 | DeGarrido et al. | |
| 2006/0176953 A1 | 8/2006 | Mohsenian | |
| 2006/0209965 A1 | 9/2006 | Tseng | |
| 2006/0222074 A1 | 10/2006 | Zhang | |
| 2006/0251172 A1 | 11/2006 | Kim | |
| 2007/0009045 A1 | 1/2007 | Mohandas | |
| 2007/0071094 A1* | 3/2007 | Takeda et al. | 375/240.04 |
| 2009/0168884 A1 | 7/2009 | Lu et al. | |
| 2010/0014583 A1 | 1/2010 | Shimizu et al. | |

FOREIGN PATENT DOCUMENTS

| | | |
|---|---|---|
| EP | 1182888 A2 | 2/2002 |
| EP | 1 274 253 A2 | 1/2003 |
| EP | 1662801 A1 | 5/2006 |
| JP | 04-150284 A | 5/1992 |
| JP | 04-298184 A | 10/1992 |
| JP | 05-328333 A | 12/1993 |
| JP | 6-113271 A | 4/1994 |
| JP | 6-237448 A | 8/1994 |
| JP | 7-203430 A | 8/1995 |
| JP | 7-264579 A | 10/1995 |
| JP | 08-009379 A | 1/1996 |
| JP | 08-9379 A | 1/1996 |
| JP | 8-116448 A | 5/1996 |
| JP | 9-098427 A | 4/1997 |
| JP | 10-126792 A | 5/1998 |
| JP | 10-290461 A | 10/1998 |
| JP | 11-55671 A | 2/1999 |
| JP | 11-196424 A | 7/1999 |
| JP | 11-239354 A | 8/1999 |
| JP | 11-252572 A | 9/1999 |
| JP | 2000-023162 A | 1/2000 |
| JP | 2000-138938 A | 5/2000 |
| JP | 2000-201328 A | 7/2000 |
| JP | 2000-244921 A | 9/2000 |
| JP | 2000-261799 A | 9/2000 |
| JP | 2002-010260 A | 1/2002 |
| JP | 2002-247587 | 8/2002 |
| JP | 2004-64725 A | 2/2004 |
| JP | 2004-134896 A | 4/2004 |
| JP | 2004-166088 A | 6/2004 |
| JP | 2005-45736 A | 2/2005 |
| JP | 2005-073245 A | 3/2005 |
| JP | 2005-102170 A | 4/2005 |
| JP | 2005-295526 A | 10/2005 |
| JP | 2005-318468 A | 11/2005 |
| JP | 2006-005466 A | 1/2006 |
| JP | 2006-506032 A | 2/2006 |
| JP | 2006-203437 A | 8/2006 |
| JP | 2006-270683 | 10/2006 |
| JP | 2006-295535 A | 10/2006 |
| RU | 2 123 769 C1 | 12/1998 |
| RU | 2 127 962 C1 | 3/1999 |
| RU | 2 137 194 C1 | 9/1999 |
| RU | 2 210 817 C2 | 8/2003 |
| RU | 2 277 761 C2 | 7/2004 |
| RU | 2004 125 588 A | 1/2006 |
| SU | 1649674 A1 | 5/1991 |
| TW | 200629911 A | 8/2006 |
| WO | WO-01/10135 A1 | 2/2001 |
| WO | 03/084242 A2 | 10/2003 |
| WO | WO-2006/006564 A1 | 1/2006 |
| WO | 2006/096869 A2 | 9/2006 |

OTHER PUBLICATIONS http://iphome.hhi.de/suehring/tml/download/ on the Internet.

ISO/IEC-13818-2, "Information technology—Generic coding of moving pictures and associated audio information: Video", pp. 77-85, May, 1996.

ITU-T H.264 ITU-T Rec. H.264, "Advanced video coding for generic audiovisual services", pp. 146-149, Mar. 2005.

Sakae Okubo, Shinya Kadono, Yoshihiro Kikichi, and Teruhiko Suzuki, "H.264/AVC Textbook", Impress, pp. 144-146, 2004.

CABAC: Detlev Marpe, Heiko Schwarz, Thomas Wiegand, "Context-Based Adaptive Binary Arithmetic Coding in the H.264/AVC Video Compression Standard", IEEE Transactions on Circuits and Systems for Video Technology, vol. 13, No. 7, pp. 620-636, Jul. 2003.

Sullivan, Gary J., et al., "Rate-Distortion Optimization for Video Compression," IEEE Signal Processing Magazine, Nov. 1998, pp. 74-90, vol. 15, No. 6.

Vetro, Anthony, et al., "MPEG-4 Rate Control for Multiple Video Objects," IEEE Transactions on Circuits and Systems for Video Technology, Feb. 1999, pp. 186-199, vol. 9, No. 1.

Yin, Ming, et al., "A Rate Control Scheme for H.264 Video Under Low Bandwidth Channel," Journal of Zhejiang University Science A, Jun. 2006, pp. 990-995, vol. 7, No. 6.

Edited by the Institute of Television Engineers of Japan, Sogo Multimedia Sensho MPEG, 1st edition, Ohmsha, Ltd., Apr. 20, 1996, pp. 110 to 113, 5-5 Rate Seigyo to Buffer Seigyo 1 Bit Haibun, Rate Seigyo to Tekioryosika (1) Step 1.

MPEG-2, Test Model 5 (TM5), Doc.ISO/IECJTC1/SC29/WG11/ NO400, Test Model Editing Committee, pp. 59-63, Apr. 1993.

Lu, Xiaoan, et al., "Fast Mode Decision and Motion Estimation for H.264 with a Focus on MPEG-2/H.264 Transcoding," Conference Proceedings, IEEE International Symposium on Circuits and Systems (ISCAS), May 23, 2005, pp. 1246-1249.

Wiegand, Thomas, et al., "Overview of the H.264/AVC Video Coding Standard," IEEE Transactions on Circuits and Systems for Video Technology, vol. 13, No. 7, Jul. 2003, pp. 560-576.

Richardson, Iain, "H.264 and MPEG-4 Video Compression: Video Coding for Next Generation," Moscow: Tekhnosfera, 2005, pp. 55-65, 228-240 (pp. 33-42, 172-184 of translation).

Yi, Xiaoquan, et al., "Improved and simplified fast motion estimation for JM," Joint Video Team (JVT) of ISO/IEC MPEG & ITU-T VCEG, JVT-P021, 16th Meeting: Poznan, Poland, Jul. 24-29, 2005, pp. 1-23.

Richardson, Iain, "H.264 and MPEG-4 Video Compression: Video Coding for Next Generation," Moscow: Tekhnosfera, 2005, pp. 261-269 (pp. 201-207 of translation).

Fujita, Gen, et al., "Real-time Processing Method for H.264 CABAC Using low Clock Frequency," IEICE Technical Report, The Institute of Electronics, Information and Communication Engineers, vol. 106, No. 116, Jun. 16, 2006, pp. 19-23.

\* cited by examiner

ENCODING BIT-RATE CONTROL METHOD AND APPARATUS, PROGRAM THEREFOR, AND STORAGE MEDIUM WHICH STORES THE PROGRAM

TECHNICAL FIELD

The present invention relates to an encoding bit-rate control method used in video encoding in which intraframe prediction and interframe prediction are switchably used, a corresponding apparatus, an encoding bit-rate control program for implementing the encoding bit-rate control, and a computer-readable storage medium which stores the program.

Priority is claimed on Japanese Patent Application No. 2007-064271, filed Mar. 14, 2007, the contents of which are incorporated herein by reference.

BACKGROUND ART

In many video encoding methods, the amount of generated code varies depending on the character of an input image. Therefore, an encoding bit rate control technique is required for controlling the amount of generated code and keeping a constant encoding bit rate.

The amount of generated code closely relates to the quantization step size, and the amount of generated code is controlled by varying the quantization step size.

In test model 5 (abbreviated as "TM5") of MPEG-2, code amount control is performed using a relationship between the quantization step size and the amount of generated code (see, for example, Non-Patent Document 1).

Below, the code amount control in TM5 of MPEG-2 will be explained.

In TM5 of MPEG-2, code amount control is performed using a unit called GOP (group of pictures), which may include I, P, and B pictures having different picture types such as I, P, and B picture types.

FIG. 7 shows a flowchart of the code amount control in TM5 of MPEG-2.

As shown in the flowchart, in the code amount control of TM5 in MPEG-2, in the first step S301, a complex index $X_x$ for each picture type (x=i, p, b (which respectively correspond to I, P, and B pictures)) is computed by the following formula:

$$X_x = S_x \cdot \langle Q_x \rangle$$

In the above formula, x indicates the picture type, $S_x$ indicates the amount of code generated for an image which has the same picture type as the present image and was encoded most recently, and $\langle Q_x \rangle$ indicates an average of the quantization step size in the relevant encoding.

Generally, the code amount $S_x$ is in inverse proportion to the quantization step size $Q_x$. Therefore, computation of the complex index $X_x$ gives a relationship between the amount of generated code and the quantization step size.

In the next step S302, a target amount $T_x$ of code (x=i, p, b) for each picture type is computed by the following formulas.

$$T_i = \frac{R}{1 + \frac{N_p X_p}{X_i K_p} + \frac{N_b X_b}{X_i K_b}} \quad \text{[Formula 1]}$$

$$T_p = \frac{R}{N_p + \frac{N_b K_p X_b}{X_p K_b}}$$

-continued $$T_b = \frac{R}{N_b + \frac{N_p K_b X_p}{X_b K_p}}$$

Here, R indicates the amount of code allocated to the relevant GOP, $N_p$ indicates the number of P pictures in the GOP, $N_b$ indicates the number of B pictures in the GOP, and $K_p$ and $K_b$ are constants.

The above formulas show that in order to set the target code amount $T_i$, P pictures are converted to I pictures in accordance with $X_p/X_i$, B pictures are converted to I pictures in accordance with $X_b/X_i$, and the target code amount $T_i$ is computed based on the converted values, the numbers $N_p$ and $N_b$ of pictures, and the amount R of code allocated to the GOP.

In order to set the target code amount $T_p$, B pictures are converted to P pictures in accordance with $X_b/X_p$, and the target code amount $T_p$ is computed based on the converted value, the numbers $N_p$ and $N_b$ of pictures, and the amount R of code allocated to the GOP.

In order to set the target code amount $T_b$, P pictures are converted to B pictures in accordance with $X_p/X_b$, and the target code amount $T_b$ is computed based on the converted value, the numbers $N_p$ and $N_b$ of pictures, and the amount R of code allocated to the GOP.

In the next step S303, based on the target code amount $T_x$ set above for the pictures, the quantization step size for a small block as an encoding target is determined.

In the next step S304, each small block is subjected to quantization and encoding by using the determined quantization step size.

In the next step S305, after encoding of one picture is completed, an average $\langle Q_x \rangle$ of the quantization step size is computed.

In the next step S306, (after encoding of one picture is completed,) the actual amount $S_x$ of generated code is measured.

Based on the measured amount $S_x$ of generated code and the computed average quantization step size $\langle Q_x \rangle$, in step S301 again, the complex index $X_x$ for each picture type is updated.

In accordance with the above method, in TM5 of MPEG-2, a target amount of code is assigned to each picture when encoding the picture, thereby controlling the amount of generated code.

In the conventional method, the target amount of code is determined based on the amount of code allocated to the relevant GOP and the complex index for each picture type. This method is based on a prior relationship such that the quantization step size is inversely proportional to the amount of generated code.

However, if the amount of code generated for an element (e.g., the motion vector for motion-compensated prediction, the encoding mode, etc.) which has no relation to the quantization step size is dominant, then the prior relationship may be ineffective. If the prior relationship is ineffective, the amount of generated code is erroneously estimated, and thus the target amount of code is not accurately determined.

In order to solve the above problem, Patent Document 1 discloses a method of performing quantization control without considering the amount of fixed-length code.

In this method, the amount of code required for each element (e.g., DC components or motion vectors in the intraframe encoding mode of MPEG-2) which does not depend on the bit rate is defined as the amount of code independent of the quantization step size.

Non-Patent Document 1: MPEG-2, Test Model5(TM5), Doc.ISO/IECJTC1/SC29/WG11/NO400, Test Model Editing Committee, pp. 59-63, April, 1993.
Patent Document 1: Japanese Unexamined Patent Application, First Publication No. H10-290461.

DISCLOSURE OF INVENTION

Problem to be Solved by the Invention

In Non-Patent Document 1, the quantization step size is not considered when selecting the encoding mode. Therefore, regardless of the level of roughness in quantization, a prediction mode which produces a minimum prediction error is selected.

Such a method causes no serious problems in many known video encoding methods in which the amount of code required for orthogonal transformation coefficients is considerably larger than the amount of code required for motion vectors.

However, in an encoding method in H.264 of ITU-T in which at largest 32 motion vectors are assigned to one macroblock, the amount of code required for the orthogonal transformation coefficients is not always dominant in the total amount of generated code.

In an encoding method in which the amount of code generated for elements other than the orthogonal transformation coefficients is dominant, if the prediction mode for producing the minimum prediction error is always selected, the amount of code generated for the elements other than the orthogonal transformation coefficients increases, which degrades the encoding efficiency.

Therefore, when selecting the prediction mode, the relevant cost is computed based on, not only the prediction error power, but also a weighting using the amount of code required for an element (e.g., the motion vector) other than the orthogonal transformation coefficients, by using the quantization step size.

In H.264 reference software, the cost function "Cost=D+$\lambda \cdot A$" is used when selecting the prediction mode.

In the above formula, D indicates the prediction error power, A indicates the amount of code generated for the elements other than the orthogonal transformation coefficients, and $\lambda$ is a constant determined by the quantization step size.

When the quantization step size decreases, $\lambda$ also decreases, so that the prediction error power dominates the cost function. In contrast, when the quantization step size increases, $\lambda$ also increases, so that the amount of code generated for the elements other than the orthogonal transformation coefficients dominates the cost function.

As described above, the method disclosed in Patent Document 1 is based on a premise that the amount of code generated for the elements other than the orthogonal transformation coefficients does not depend on the quantization step size. Therefore, if a prediction mode selection using the above cost function is performed in an encoding method as defined in H.264 of ITU-T, in which the amount of code generated for the elements other than the orthogonal transformation coefficients is relatively large, then the amount of generated code is not accurately estimated, and thus it may be difficult to control the amount of code.

In light of the above circumstances, an object of the present invention is to provide a novel technique by which even in an encoding method in which the amount of code generated for the elements other than the orthogonal transformation coefficients is dominant, a target amount of code in consideration of the relevant amount of generated code can be set so as to implement a reliable encoding bit-rate control.

Means for Solving the Problem

In order to achieve the object, the present invention provides an encoding bit-rate control apparatus used in video encoding in which intraframe prediction and interframe prediction are switchably used. The apparatus includes (1) a first measurement device that measures an amount of code generated for quantized information for a picture which has been encoded; (2) a second measurement device that measures an amount of code generated for non-quantized information for the picture which has been encoded; (3) a computation device that computes a ratio of the amount of code generated for the non-quantized information to the total amount of generated code, based on the amounts of code measured by the first and second measurement devices; and (4) a determination device that determines a target amount of code of an encoding target picture by using the ratio (computed by the computation device) of the amount of code generated for the non-quantized information.

In the above structure, a function which defines a relationship between the quantization step size and the ratio of the amount of code generated for the non-quantized information may be used, where the function may be formed by straight lines having different gradients corresponding to different value ranges of the quantization step size. In such a case, the apparatus may further includes a function determination device for determining the function based on the ratio (computed by the computation device) of the amount of code generated for the non-quantized information and a quantization step size used in the encoding of the picture which has been encoded.

The encoding bit-rate control method of the present invention implemented by operating the above-described devices can also be implemented by a computer program. Such a computer program may be provided by storing it in an appropriate computer-readable storage medium, or by means of a network, and can be installed and operate on a control device such as a CPU so as to implement the present invention.

In the encoding bit-rate control apparatus of the present invention having the above-described structure, an amount of code generated for quantized information for a picture which has been encoded is measured, and an amount of code generated for non-quantized information for the picture which has been encoded is also measured.

Based on the above measured amounts of code, a ratio of the amount of code generated for the non-quantized information to the total amount of generated code is computed. Then, a target amount of code of an encoding target picture is determined by using the computed ratio of the amount of code generated for the non-quantized information For example, a complex index for the quantized information of the picture which has been encoded is computed; an amount of code generated when the encoding target picture is encoded using a predetermined assumed quantization step size is estimated based on the computed complex index and the computed ratio of the amount of code generated for the non-quantized information; and the target amount of code of the encoding target picture is determined by using the estimated amount of generated code.

As the above assumed quantization step size, the assumed quantization step size for a picture (of P or B picture type) encoded by interframe prediction may be computed by using a quantization step size which was used when encoding a picture (I picture) by intraframe prediction and a predetermined ratio value.

In addition, the computed ratio of the amount of code generated for the non-quantized information may be varied using a function (determined by the function determination device) in accordance with the assumed quantization step size; and the target amount of code of the encoding target picture may be determined by using the varied ratio of the amount of generated code.

Effect of the Invention

As described above, in the present invention, even in an encoding method in which the amount of code generated for non-quantized information is dominant, a target amount of code in consideration of the relevant amount of generated code can be set.

Therefore, in accordance with the present invention, the target amount of code is determined in consideration of the amount of code generated for non-quantized information. Therefore, an error in the estimated amount of generated code decreases, and a stable encoding bit-rate control can be performed.

Figure 1:
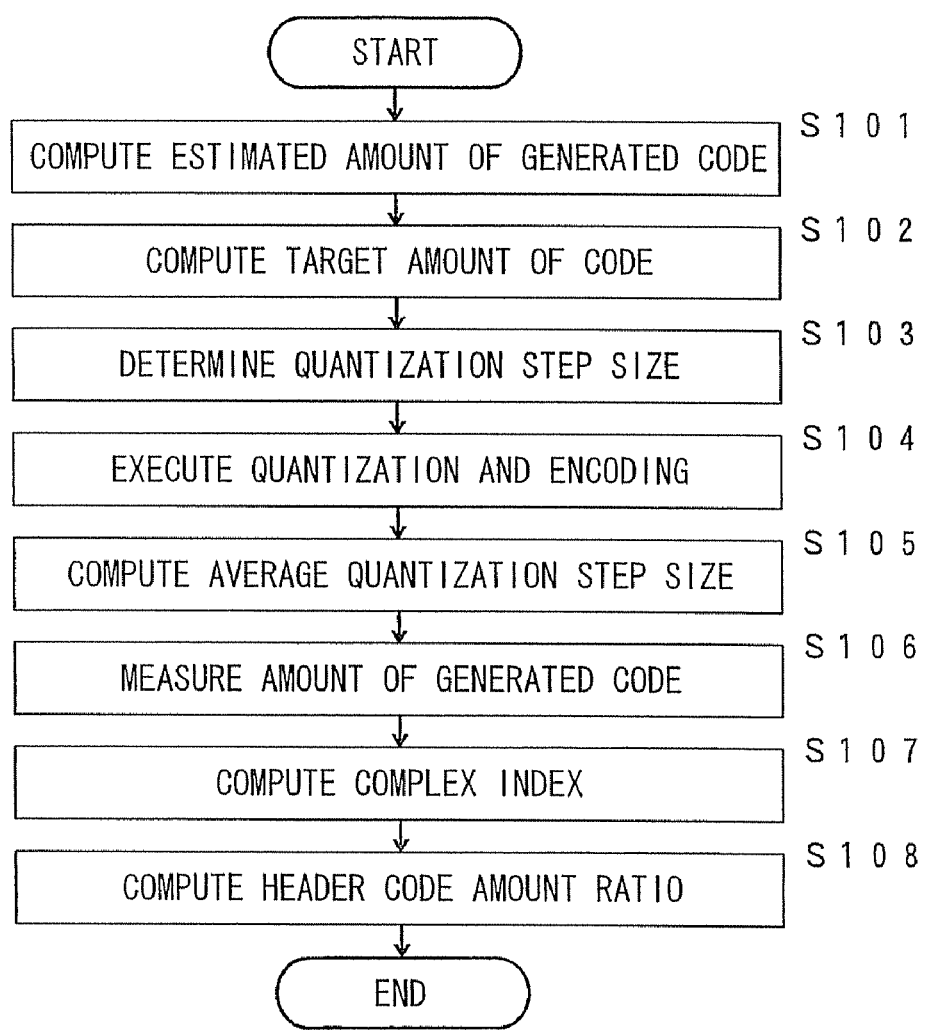
FIG. 1 is a flowchart of an operation in accordance with the present invention.

REFERENCE SYMBOLS 1 video encoding apparatus
10 quantization controller
20 quantization and encoding execution unit
100 picture type manager
101 assumed quantization step size computation unit
102 estimated generated code amount computation unit
103 target code amount computation unit
104 quantization step size computation unit
105 I picture information storage unit
106 I picture information updater
107 parameter information storage unit
108 GOP information storage unit
109 updating unit
1070 transformation coefficient code amount complex index storage part
1071 header code amount ratio derivation function storage part
1072 picture complex index storage part
1090 parameter information updater
1091 GOP information updater

BEST MODE FOR CARRYING OUT THE INVENTION

Below, the present invention will be explained with reference to embodiments of the present invention.

As the present invention refers to the amount of code generated for elements other than the orthogonal transformation coefficients (which will be called "header code amount"), the ratio between the amount of code generated for the orthogonal transformation coefficients and the header code amount is computed so as to accurately estimate the amount of generated code.

FIG. 1 shows a flowchart of an operation in accordance with the present invention.

In the first step S101, the amount of code generated by means of encoding using an assumed quantization step size is estimated, where the assumed quantization step size is predetermined for each picture type.

In this process, the estimated amount of generated code is computed using the following information:
(i) complex index for the amount of code required for transformation coefficients: $\alpha_{sx}$, where x=i, p, b
(ii) header code amount ratio: $\alpha_{rx}$, where x=i, p, b Here, when the header code amount ratio (i.e., "header code amount/total amount of generated code") varies depending on the quantization step size, the header code amount ratio is treated as a function of the quantization step size $Q_x$ (x=i, p, b), as follows:

$$\alpha_{rx} = \text{Func}(Q_x)$$

Figure 2:
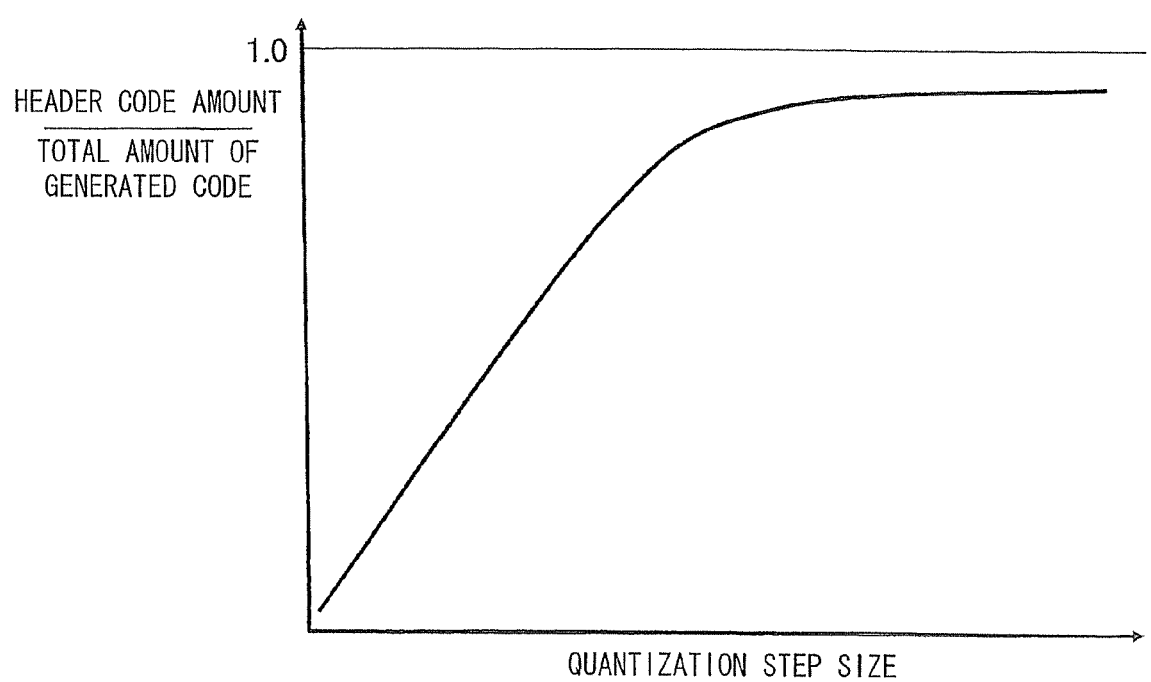
FIG. 2 is a diagram explaining the header code amount ratio.

For example, as shown in FIG. 2, when the header code amount ratio $\alpha_{rx}$ varies depending on the quantization step size $Q_x$, the header code amount ratio should be computed as a function of the quantization step size $Q_x$.

Such a function is determined depending on the cost computation method used when selecting the encoding mode. That is, it is necessary to use a function suitable for the employed cost computation method.

In the next step S102, the target amount of code of an encoding target picture is computed based on the amount of generated code estimated for each picture type.

In the next step S103, based on the computed target amount of code, the quantization step size for small blocks (as encoding targets) in the encoding target picture is determined.

In the next step S104, quantization and encoding operations are executed for each small block, by using the determined quantization step size.

After the encoding operation for the relevant one picture is completed, the following parameters are computed:
average quantization step size: $<Q_x>$
(ii) complex index for the amount of code required for transformation coefficients: $\alpha_{sx}$, where x=i, p, b
(iii) header code amount ratio: $\alpha_{rx}$, where x=i, p, b That is, in the next step S105, an average $<Q_x>$ of the quantization step size is computed.

In the next step S106, the amount $G_{tx}$ of code required for transformation coefficients and the header code amount $G_{hx}$ are measured.

In the next step S107, the product of the code amount $G_{tx}$ for the transformation coefficients and the average quantization step size $<Q_x>$ is computed, so as to compute the complex index $\alpha_{sx}$ (for the code amount for the transformation coefficients) used in the next picture having the same type as the present picture.

In the next step S108, the header code amount ratio $\alpha_{rx}$, which is the ratio of the header code amount $G_{hx}$ to the total amount $G_x$ of generated code, is computed, that is, the header code amount ratio $\alpha_{rx}$ used in the next picture having the same type as the present picture is computed.

If the header code amount ratio $\alpha_{rx}$ does not depend on the quantization step size, the header code amount ratio $\alpha_{rx}$ can be computed by the following formula:

$$\alpha_{rx} = G_{hx}/G_x$$

When the header code amount ratio $\alpha_{rx}$ is computed as the function $\text{Func}(Q_x)$ of the quantization step size $Q_x$, parameters necessary for the relevant value computation are computed.

As described above, in accordance with the present invention, the target amount of code is determined in consideration of the header code amount, so that an error in the estimated amount of generated code decreases, and stable encoding bit-rate control can be performed.

Specific Embodiment

Below, the present invention will be further explained in accordance with a specific embodiment.

Figure 3:
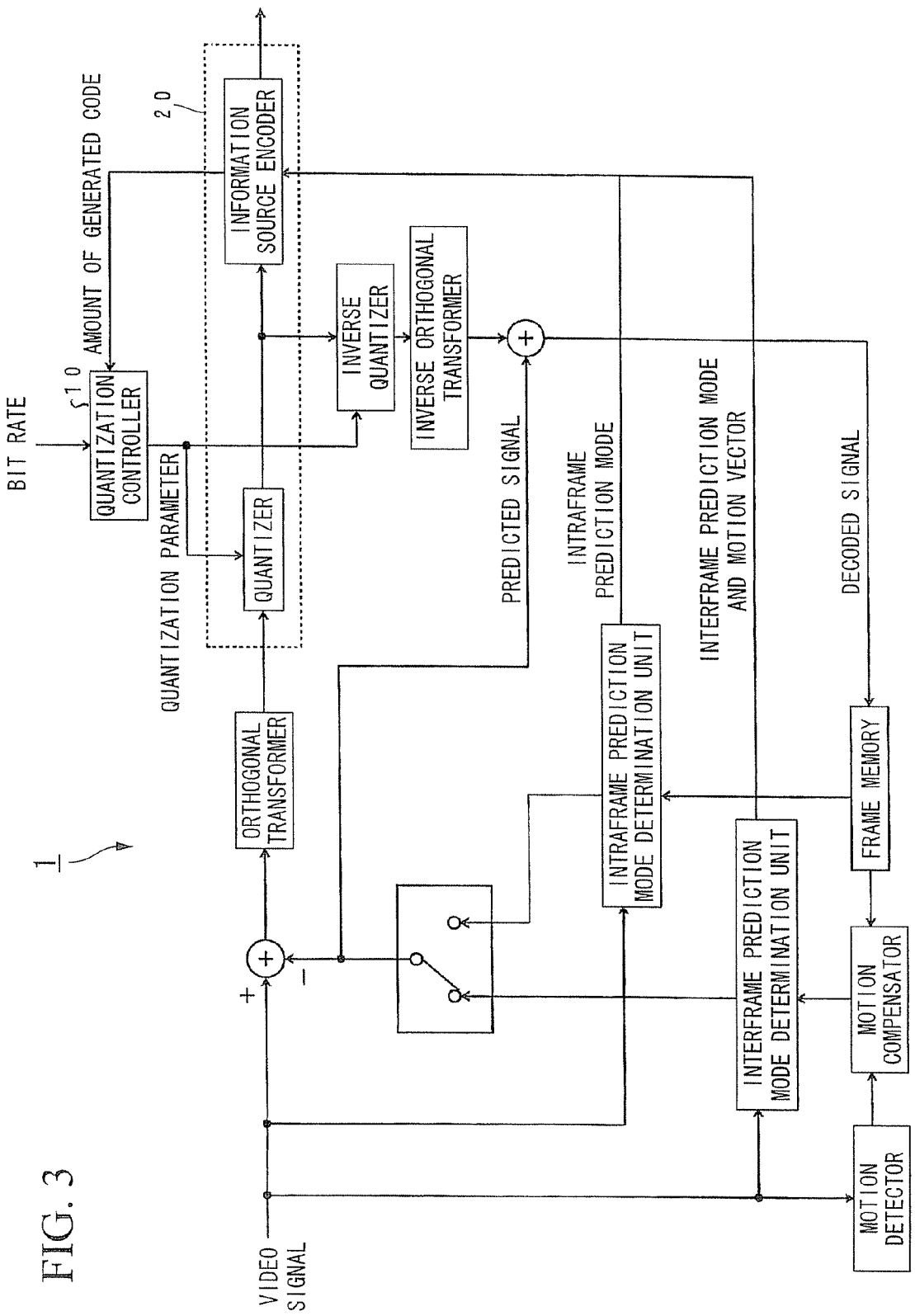
FIG. 3 is a diagram showing an example structure of a video encoding apparatus to which the present invention is applied.

FIG. 3 shows a structure of a video encoding apparatus 1 as an embodiment of the present invention.

As shown in FIG. 3, the video encoding apparatus 1 performs an operation for generating a predicted signal of a video signal, computing a difference between the video signal and the predicted signal, and generating and outputting an encoded bit stream by quantizing and encoding the difference. The video encoding apparatus 1 has a quantization controller 10 for performing quantization control, and a quantization and encoding execution unit 20 which includes a quantizer and an information source encoder.

Figure 4:
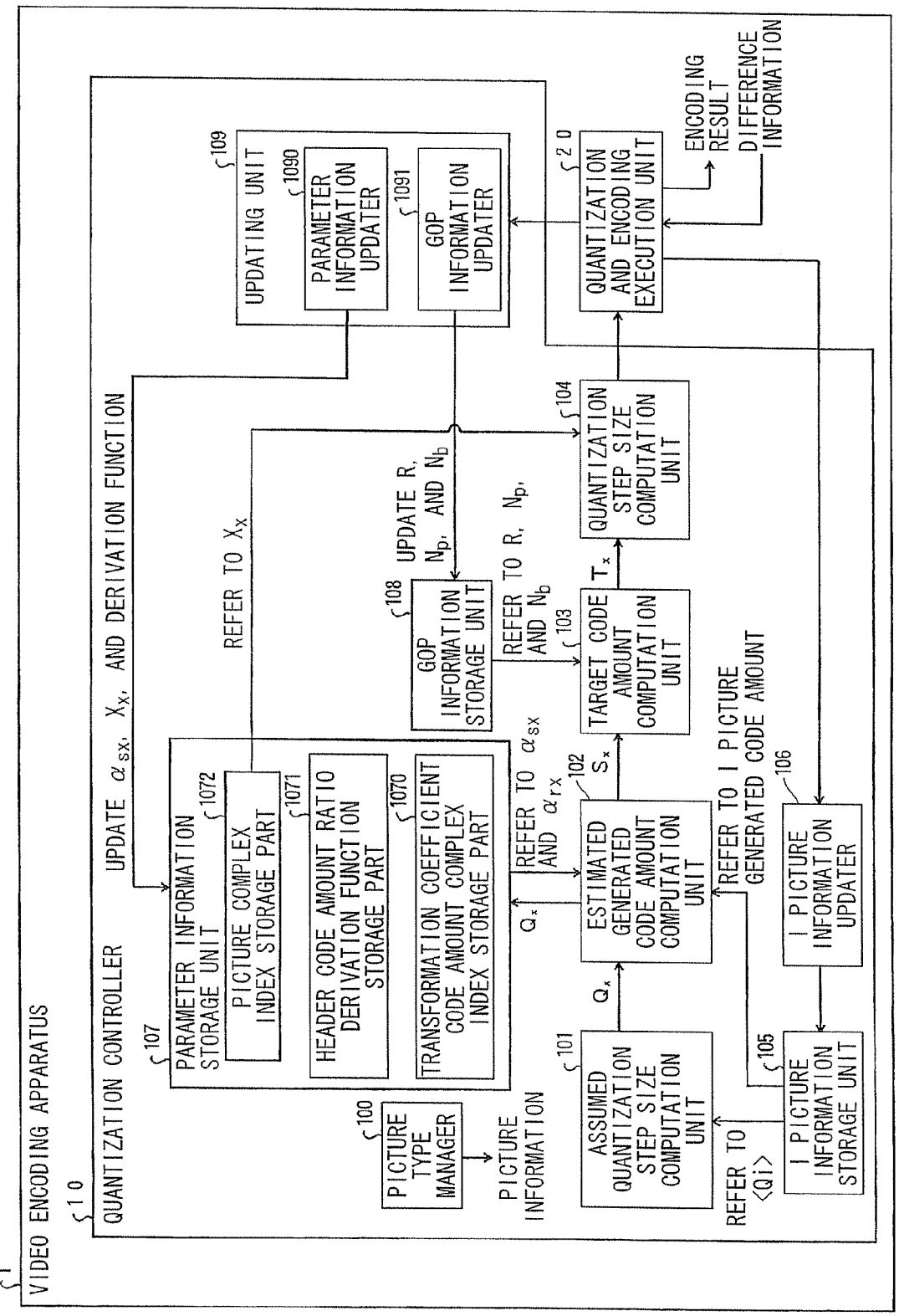
FIG. 4 is a diagram showing an example inner structure of the video encoding apparatus.

FIG. 4 shows an example of the structure of the quantization controller 10 in the video encoding apparatus 1.

As shown in FIG. 4, in order to control the encoding bit-rate by performing per-GOP code amount allocation (i.e., based on the intra frame period) in accordance with the present invention, the quantization controller 10 has a picture type manager 100, an assumed quantization step size computation unit 101, an estimated generated code amount computation unit 102, a target code amount computation unit 103, a quantization step size computation unit 104, an I picture information storage unit 105, an I picture information updater 106, a parameter information storage unit 107, a GOP information storage unit 108, and an updating unit 109.

The picture type manager 100 manages information which indicates the picture type of a current target processed in the quantization controller 10.

The assumed quantization step size computation unit 101 computes quantization step sizes $Q_p$ and $Q_b$ for P and B picture types, based on (i) an average quantization step size $<Q_i>$ of an I picture which was encoded immediately before (an I picture to be encoded) and (ii) predetermined ratio values $R_p$ and $R_b$.

Here, the present embodiment is based on the average quantization step size $<Q_i>$ of an I picture which was encoded immediately before, and it is assumed that the ratios $R_p$ and $R_b$ between the average quantization step size $<Q_i>$ and the respective step sizes $Q_p$ and $Q_b$ for P and B picture types are constant.

The estimated generated code amount computation unit 102 estimates amounts $S_p$ and $S_b$ of generated code for P and B picture types, based on the assumed quantization step size $Q_x$ computed by the assumed quantization step size computation unit 101, a complex index $\alpha_{sx}$ for the amount of code required for transformation coefficients, and a header code amount ratio $\alpha_{rx}(Q_x)$. Here, for the I picture type, the amount of code generated for the I picture which was encoded immediately before is determined to be an estimated result ($S_i$).

The target code amount computation unit 103 computes the target amount $T_x$ of code of the encoding target picture, based on the generated code amount $S_x$ estimated by the estimated generated code amount computation unit 102, the amount of code (represented by "R") allocated to the relevant GOP, the number $N_p$ of P pictures in the relevant GOP, and the number $N_b$ of B pictures in the relevant GOP.

The quantization step size computation unit 104 computes the quantization step size $Q_x$ based on the target code amount $T_x$ computed by the target code amount computation unit 103 and a complex index $X_x$ for each picture type.

The quantization and encoding execution unit 20 subjects each small block to quantization and encoding operations by using the quantization step size $Q_x$ computed by the quantization step size computation unit 104.

The I picture information storage unit 105 stores (i) the average quantization step size $<Q_i>$ of the I picture which was encoded immediately before, where $<Q_i>$ is referred to by the assumed quantization step size computation unit 101, and (ii) the amount of code generated for the I picture which was encoded immediately before, where the generated code amount is referred to by the estimated generated code amount computation unit 102.

The I picture information updater 106 updates the information stored in the I picture information storage unit 105, based on the results of operations executed by the quantization and encoding execution unit 20.

The parameter information storage unit 107 includes:
(i) a transformation coefficient code amount complex index storage part 1070 for storing a complex index $\alpha_{sx}$ for the amount of code required for transformation coefficients, where $\alpha_{sx}$ is referred to by the estimated generated code amount computation unit 102;
(ii) a header code amount ratio derivation function storage part 1071 for storing information about a function used for deriving the header code amount ratio $\alpha_{rx}(Q_x)$, where $\alpha_{rx}(Q_x)$ is also referred to by the estimated generated code amount computation unit 102; and
(iii) a picture complex index storage part 1072 for storing the complex index $X_x$ for each picture type, where $X_x$ is referred to by the quantization step size computation unit 104.

The parameter information storage unit 107 stores the above-described information items by means of the above storage parts.

The header code amount ratio derivation function storage part 1071 stores information of a function used for deriving the header code amount ratio $\alpha_{rx}(Q_x)$, for example, information ($\alpha_x$ (gradient of straight line, explained later) and $Qth_x$) of the following function formed by two straight lines (see two dotted lined in FIG. 5) defined on both sides of the quantization step size $Qth_x$:

$$\alpha_{rx}(Q_x) = \alpha_x \cdot Q_x \quad Q_x < Qth_x$$
$$= 0.95 \quad Q_x \geq Qth_x$$

The GOP information storage unit 108 stores the code amount R, the numbers $N_p$ and $N_b$ of respective P and B pictures (which have not yet been encoded), where R, $N_p$, and $N_b$ are referred to by the target code amount computation unit 103.

In order to update the information stored in the parameter information storage unit 107 and the GOP information storage unit 108, the updating unit 109 includes:
(i) a parameter information updater 1090 for updating the information stored in the parameter information storage unit 107, based on the results of operations executed by the quantization and encoding execution unit 20; and
(ii) a GOP information updater 1091 for updating the information stored in the GOP information storage unit 108, based on the results of operations executed by the quantization and encoding execution unit 20.

Figure 6:
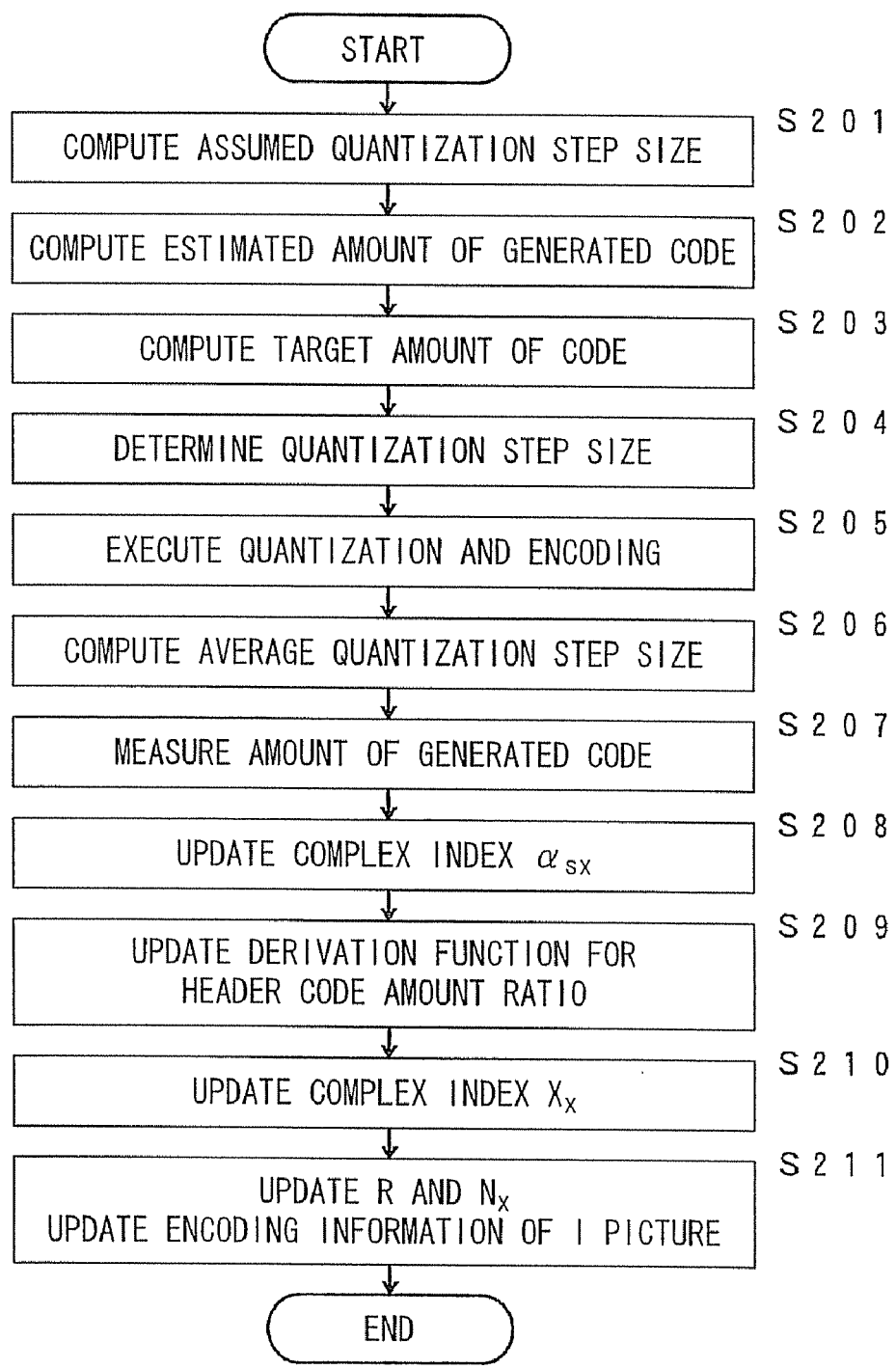
FIG. 6 is a diagram showing an example flowchart performed by the video encoding apparatus.
Figure 7:
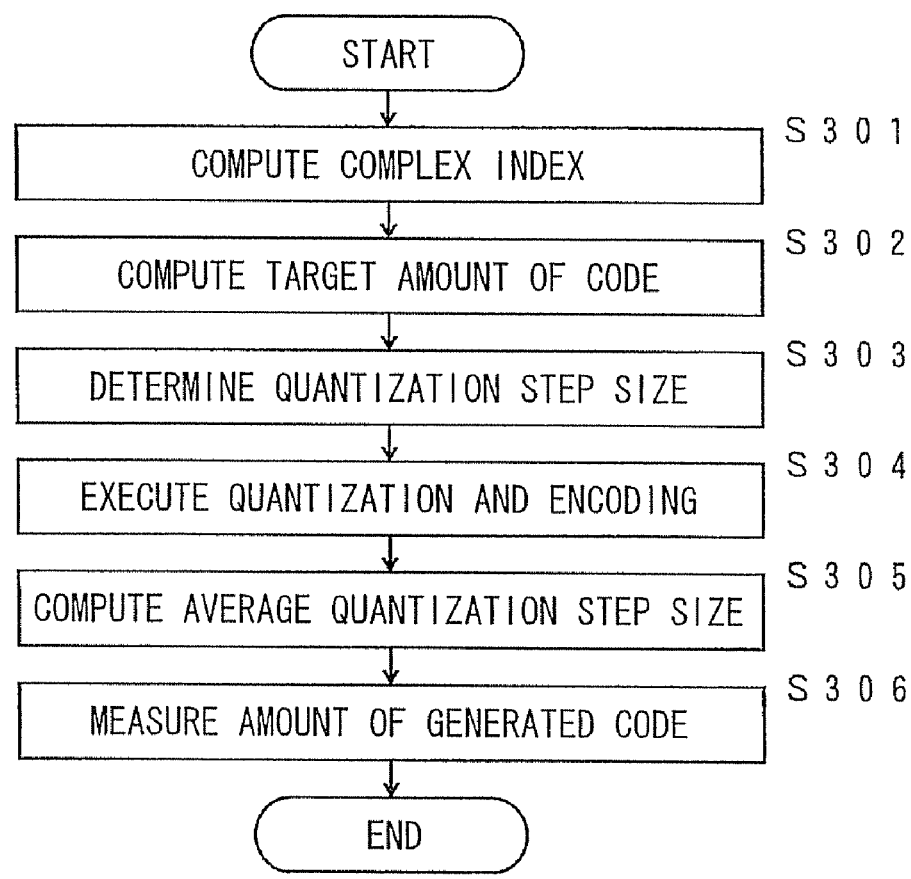
FIG. 7 is a diagram showing a flowchart of the code amount control in TM5 of MPEG-2.

FIG. 6 shows an example of a flowchart performed by the video encoding apparatus 1 having the structure of FIG. 4.

In accordance with this flowchart, the encoding bit-rate control operation executed by the video encoding apparatus 1 will be explained in detail.

As shown in the first step S201 of the flowchart of FIG. 6, in the video encoding apparatus 1, assumed quantization step sizes $Q_p$ and $Q_b$ of P and B picture types are first computed based on the average quantization step size $<Q_i>$ (read from the I picture information storage unit 105) of an I picture which was encoded immediately before, and the predetermined ratio values $R_p$ and $R_b$, in accordance with the following formula:

$$Q_x = <Q_i>/R_x$$

In the next step S202, the amounts $S_p$ and $S_b$ of generated code for P and B picture types are estimated based on the computed assumed quantization step size Qx, the complex index $\alpha_{sx}$ (read from the transformation coefficient code amount complex index storage part 1070) for the code amount for transformation coefficients, and the header code amount ratio $\alpha_{rx}(Q_x)$ (computed based on the function information stored in the header code amount ratio derivation function storage part 1071), in accordance with the following formula:

$$S_x = \alpha_{sx}/[(1-\alpha_{rx}(Q_x))\cdot Q_x]$$

For the I picture type, the code amount (read from the I picture information storage unit 105) generated for the I picture which has been encoded immediately before is determined to be the estimated result.

In the next step S203, the target amount $T_x$ of code for the encoding target picture is computed based on (i) the generated code amount $S_x$ estimated for each picture type, and (ii) the code amount R and the numbers $N_p$ and $N_b$ for the P and B pictures, which are read from the GOP information storage unit 108, in accordance with the formulas shown below.

That is, when the encoding target picture is an I picture, the target code amount $T_i$ of the encoding target picture is computed by the following formula.

$$T_i = \frac{R}{1 + \frac{N_p S_p}{S_i} + \frac{N_b S_b}{S_i}} \quad \text{[Formula 2]}$$

When the encoding target picture is a P picture, the target code amount $T_p$ of the encoding target picture is computed by the following formula.

$$T_p = \frac{R}{N_p + \frac{N_b S_b}{S_p}} \quad \text{[Formula 3]}$$

When the encoding target picture is a B picture, the target code amount $T_b$ of the encoding target picture is computed by the following formula.

$$T_b = \frac{R}{N_b + \frac{N_p S_p}{S_b}} \quad \text{[Formula 4]}$$

In the next step S204, the quantization step size $Q_x$ is computed, for example, based on the computed target code amount $T_x$ and the complex index $X_x$ (for each picture type) read from the picture complex index storage part 1072, in accordance with the following formula:

$$Q_x = X_x/T_x$$

In the above process, the complex index $X_x$ for each picture type) is computed based on the average quantization step size $<Q_x>$ and the amount $G_x$ of generated code (which are obtained using the results of encoding a picture having the same picture type as that encoded immediately prior to the picture to be encoded) in accordance with the following formula:

$$X_x = <Q_x> \cdot G_x$$

In the next step S205, each small block is subjected to quantization and encoding by using the computed quantization step size $Q_x$.

After the encoding of the current one picture is completed, updating of the information stored in the parameter information storage unit 107 and the GOP information storage unit 108 is executed. If an I picture has been encoded, updating of the information stored in the I picture information storage unit 105 is also executed.

In the next step S206, the average quantization step size $<Q_x>$ is computed.

In the next step S207, the amount $G_{tx}$ of code required for transformation coefficients and the header code amount $G_{hx}$ are measured, and the sum of them is computed so as to obtain the amount $G_x$ of generated code.

In the next step S208, the product of the code amount $G_{tx}$ for the transformation coefficients and the average quantization step size $<Q_x>$ is computed, as follows:

$$\alpha_{sx} = G_{tx} \cdot <Q_x>$$

That is, the complex index $\alpha_{sx}$ for the code amount for the transformation coefficients is computed. Based on the computed value, the complex index $\alpha_{sx}$ stored in the transformation coefficient code amount complex index storage part 1070 is updated.

Figure 5:
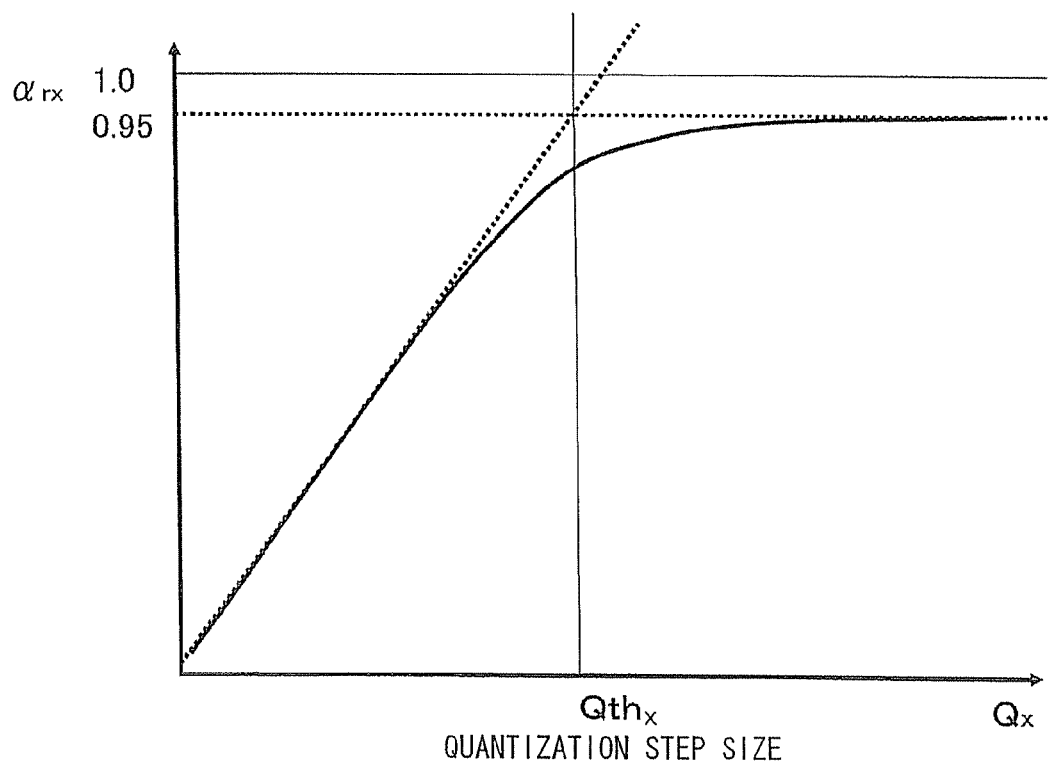
FIG. 5 is a diagram showing an example of a function used for deriving the header code amount ratio.

In the next step S209, the gradient $\alpha_x$ of the straight line of the derivation function for the header code amount ratio $\alpha_{rx}$ shown in FIG. 5 is computed based on the generated code amount $G_x$, the header code amount $G_{hx}$, and the average quantization step size $<Q_x>$, in accordance with the following formula:

$$\alpha_x = G_{hx}/[G_x \cdot <Q_x>]$$

In addition, a quantization step size $Qth_x$ obtained when the relevant straight line has a value "0.95" of $\alpha_{rx}$ is computed. In accordance with the computed values, the function information (of $\alpha_x$ and $Qth_x$) stored in the header code amount ratio derivation function storage part 1071 is updated.

In the next step S210, the complex index $X_x$ for each picture type is computed based on the generated code amount $G_x$ and the average quantization step size $<Q_x>$, in accordance with the following formula:

$$X_x = <Q_x> \cdot G_x$$

In accordance with the computed values, the complex index $X_x$ (for each picture type) stored in the picture complex index storage part 1072 is updated.

In the next step S211, the code amount R (allocated to the relevant GOP) and the number $N_x$ of pictures (which have not yet been encoded, for P and B picture types) stored in the GOP information storage unit 108 are updated. In addition, if an I picture has been encoded, the average quantization step size $<Q_x>$ and the amount of code generated for the I picture, which are stored in the I picture information storage unit 105, are updated for the encoding of the next picture.

As described above, in the present invention, the header code amount and the code amount for transformation coefficients are separately measured, and the header code amount ratio and the complex index for the code amount for transformation coefficients are computed. Therefore, the target amount of code can be determined in consideration of the header code amount, thereby implementing a stable encoding bit-rate control.

Although the present invention has been explained in accordance with the illustrated embodiment, the present invention is not limited thereto.

For example, although the derivation function for the header code amount ratio is approximated by two straight lines in the above embodiment, this condition is just an example.

Additionally, the method of computing the quantization step size based on the target amount of code in the above embodiment is also just an example.

INDUSTRIAL APPLICABILITY

In accordance with the present invention, the target amount of code is determined in consideration of the amount of code generated for non-quantized information. Therefore, an error in the estimated amount of generated code decreases, and a stable encoding bit-rate control can be performed.

The invention claimed is:

1. An encoding bit-rate control method used in video encoding in which intraframe prediction and interframe prediction are switchably used, the method comprising the steps of:
    measuring an amount of code generated for quantized information for a picture which has been encoded;
    measuring an amount of code generated for non-quantized information for the picture which has been encoded;
    computing a ratio of the amount of code generated for the non-quantized information to the total amount of generated code, based on the above measured amounts of code; and
    determining a target amount of code of an encoding target picture by:
    computing a complex index for the quantized information of the picture which has been encoded;
    estimating an amount of code generated when the encoding target picture is encoded using a predetermined assumed quantization step size, based on the computed complex index and the computed ratio of the amount of code generated for the non-quantized information; and
    determining the target amount of code of the encoding target picture by using the estimated amount of generated code.

2. The encoding bit-rate control method in accordance with claim 1, wherein the step of determining a target amount of code includes:
    computing the assumed quantization step size for a picture encoded by interframe prediction by using a quantization step size which was used when encoding a picture by intraframe prediction and a predetermined ratio value.

3. The encoding bit-rate control method in accordance with claim 1, wherein the step of determining a target amount of code includes:
    varying the computed ratio of the amount of code generated for the non-quantized information in accordance with the assumed quantization step size; and
    determining the target amount of code of the encoding target picture by using the varied ratio of the amount of generated code.

4. The encoding bit-rate control method in accordance with claim 3, wherein the step of determining a target amount of code includes:
    varying the computed ratio of the amount of code generated for the non-quantized information in accordance with the assumed quantization step size, by using a function which defines a relationship between the quantization step size and the ratio of the amount of code generated for the non-quantized information.

5. The encoding bit-rate control method in accordance with claim 4, wherein:
    the function is formed by straight lines having different gradients corresponding to different value ranges of the quantization step size.

6. The encoding bit-rate control method in accordance with claim 4, wherein:
    the function is determined based on the computed ratio of the amount of code generated for the non-quantized information and a quantization step size used in the encoding of the picture which has been encoded.

7. An encoding bit-rate control apparatus used in video encoding in which intraframe prediction and interframe prediction are switchably used, the apparatus comprising:
    a device that measures an amount of code generated for quantized information for a picture which has been encoded;
    a device that measures an amount of code generated for non-quantized information for the picture which has been encoded;
    a device that computes a ratio of the amount of code generated for the non-quantized information to the total amount of generated code, based on the above measured amounts of code; and
    a device that determines a target amount of code of an encoding target picture by:
    computing a complex index for the quantized information of the picture which has been encoded;
    estimating an amount of code generated when the encoding target picture is encoded using a predetermined assumed quantization step size, based on the computed complex index and the computed ratio of the amount of code generated for the non-quantized information; and
    determining the target amount of code of the encoding target picture by using the estimated amount of generated code.

8. A non-transitory computer-readable storage medium which stores an encoding bit-rate control program by which a computer executes an operation for implementing the encoding bit-rate control method in accordance with claim 1.

* * * * *